United States Patent [19]

Sentman

[11] Patent Number: 4,965,936
[45] Date of Patent: Oct. 30, 1990

[54] THREAD PITCH CYLINDER GAGE

[76] Inventor: Gerald K. Sentman, 831 S. Post Rd., Indianapolis, Ind. 46239

[21] Appl. No.: 248,433

[22] Filed: Sep. 23, 1988

[51] Int. Cl.$^5$ .............................................. G01B 3/48
[52] U.S. Cl. ................................. 33/199 R; 33/555.1; 33/794; 33/827; 33/829
[58] Field of Search ............. 33/178 R, 199 R, 199 B, 33/178 B, 542, 794, 797, 798, 827, 829, 501.4, 555.1, 555.2

[56] References Cited

U.S. PATENT DOCUMENTS

| 890,394 | 6/1908 | Ahrens | 33/178 R |
|---|---|---|---|
| 2,249,954 | 7/1941 | Hellberg et al. | 33/178 R |
| 2,434,535 | 1/1948 | Anders | 33/178 R |
| 2,595,917 | 5/1951 | Bath et al. | 33/178 R |
| 2,782,521 | 2/1957 | Parker et al. | 33/199 R |
| 2,841,877 | 7/1958 | Coley | 33/178 B |
| 3,516,166 | 6/1970 | Moore | 33/199 R |
| 3,827,154 | 8/1974 | Kaifesh | 33/199 R |
| 4,480,388 | 11/1984 | O'Brien | 33/199 R |
| 4,590,678 | 5/1986 | Arredondo | 33/199 R |

FOREIGN PATENT DOCUMENTS

| 8600120 | 8/1987 | Netherlands | 33/199 R |
|---|---|---|---|
| 164682 | 1/1965 | U.S.S.R. | 33/199 R |
| 551356 | 2/1943 | United Kingdom | 33/178 R |
| 920540 | 3/1963 | United Kingdom | 33/199 R |

Primary Examiner—William A. Cuchlinski, Jr.
Assistant Examiner—Alvin Wirthlin
Attorney, Agent, or Firm—Woodard, Emhardt, Naughton, Moriarty & McNett

[57] ABSTRACT

A thread pitch cylinder gage for an internally threaded bore in a workpiece, according to one embodiment, includes a gage post having a bearing surface extending through an externally threaded sleeve. The sleeve is trapped on the bearing surface by a retaining cap at the end of the gage post. A finger on the bearing surface engages a notch in the sleeve to prevent rotation of the sleeve relative to the bearing surface, while permitting relative axial motion. The sleeve includes two collections of retaining cavities with balls trapped therein, one at each end of the sleeve. The cavities, and therefore the balls, are centered between the flanks of a thread on the sleeve, and the balls are radially slidable between a retracted and a locked position. The bearing surface includes a plurality of sloped cam surfaces radially aligned with the balls in the sleeve. The cam surfaces are adapted to urge the balls radially outward when the gage post is pulled axially relative to the sleeve, until the balls contact, and are locked against, the threads in the workpiece bore. The two collections of balls, when in the locked position, establish the pitch cylinder and pitch axis of the threaded bore.

15 Claims, 3 Drawing Sheets

THREAD PITCH CYLINDER GAGE

BACKGROUND OF THE INVENTION

This invention relates to a gage for determining the location of the pitch cylinder of a threaded post or bore in a workpiece. The gage of the present invention is also useful in determining the amount of positional tolerance a threaded feature has used on the workpiece, orientation of the pitch axis relative to the surface of the workpiece, and thread feature tolerances.

Several methods exist for inspecting threaded elements on a workpiece, such as a threaded post or bore. Several features of the threaded elements are inspected, including postion on the workpiece, orientation and concentricity with other features on the workpiece, perpendicularity with the surface of the workpiece, and pitch diameter. Typically, inspection of each of these features is performed with a separate gage.

For instance, positional accuracy is determined using a functional gage with hole locations corresponding to the correct bore locations in the workpiece. Separate unthreaded gage pins pass through the functional gage holes and into the workpiece bores only if the bore locations are within tolerance. In some instances, the unthreaded gage pins are integral with the functional gage. In either case, inspections of this type are not based on the pitch cylinder axis of the threaded element on the workpiece, which induces some error into the inspection. Moreover, even the use of a threaded gage pin does not necessarily establish the proper pitch cylinder axis due, for instance, to perpendicularity errors in the threaded workpiece bore.

The pitch cylinder is an imaginary cylinder formed such that the diameter of the cylinder intersects the thread profile, or flanks, where the width of the thread and groove are equal. Ideally, the pitch cylinder of a threaded feature is a cylinder formed by thread pitch diameters spaced along the length of the feature. The axis of the pitch cylinder can be defined using a minimum of four points of contact, axially and circumferentially spaced in two groups along the length of the threaded feature. Once the axis of the ptich cylinder is defined, positional aspects, for instance, can be easily gaged. To applicant's knowledge, there are no inspection gages available that accurately locate the axis of the pitch cylinder of the threaded feature to be inspected. A gage threaded to the pitch cylinder can extablish the pitch cylinder axis only when it is exactly the size of the threaded feature, and when there is no play or slop when it is engaged onto the threaded feature. A threaded gage pin of this sort would be virtually impossible to engage, and, at any rate, relatively expensive to manufacture.

Typically, inspection gages are limited to a single function—i.e., determining positional accuracy, assessing perpendicularity, or inspecting the limits of size of the threaded feature. Thus, several gages are required to inspect one workpice. Due to the precision machining of these gages, their cost is generally high. In order to reduce this cost, one option is to provide a multifunction gage, not yet available in the prior art, useful for inspecting thread position, orientation and limits of size of a threaded feature on a workpiece.

SUMMARY OF THE INVENTION

These and other shortcomings of prior art inspection gages are overcome by a pitch cylinder gage provided with at least four means for tangentially engaging the thread grooves of a threaded feature on a workpiece, and having a retaining means for the engaging means which includes means for axially spacing a plurality of the engaging means and for circumferentially spacing a separate plurality of the engaging means. The pitch cylinder gage also includes rotatable means for moving the tangentially engaging means into engagment with the thread grooves whereby a cylinder coaxial with the pitch cylinder of the threaded feature is spatially defined. The rotatable moving means includes a cam element of circumferentially varying radius rotatably coupled to the retaining means and adapted to contact the tangential engaging means and move them into engagement with the thread grooves when rotated relative to the retaining means.

According to another aspect of the invention, a pitch cylinder gage is provided with a cylindrical housing having a threaded outer surface adapted to engage the threads of a threaded bore on a workpiece, the housing defining axially separated sets of cavities extending radially through the threaded outer surface. The pitch cylinder gage includes an elongated post concentric with and rotatable within the housing, the post having a circumferentially varying radius defining a rotatably actuated cam. The pitch cylinder gage also includes a flank contact element positioned within each of the cavities, the flank contact elements each being radially extendable into contact with the thread flank of the bore in response to rotation of the cam with respect to the housing.

It is an object of the present invention to provide an accurate multi-functional gage for use in inspecting features of a threaded element on a workpiece. More particularly, it is an object to provide a gage that will properaly and accurately locate the pitch cylinder axis of the threaded element, regardless of the feature size of the element.

Another object is to provide, in a single gage, the capability of determining whether the element is within tolerance as to position, orientation, perpendicularity and thread size. Further objects and benefits of the present invention will be apparent from the following description and accompanying figures.

DESCRIPTION OF THE PREFERRED EMBODIMENTS

Figure 3:
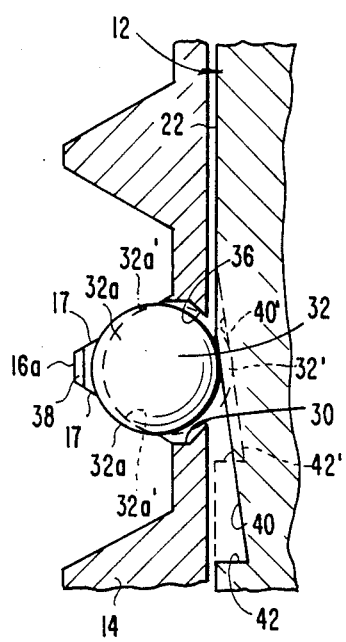
FIG. 3 is an enlarged cross sectional view of the thread pitch cylinder gage shown in FIG. 2, taken along line 3—3 and viewed in the direction of the arrows.

For the purposes of promoting an understanding of the principles of the invention, reference will now be made to the embodiments illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
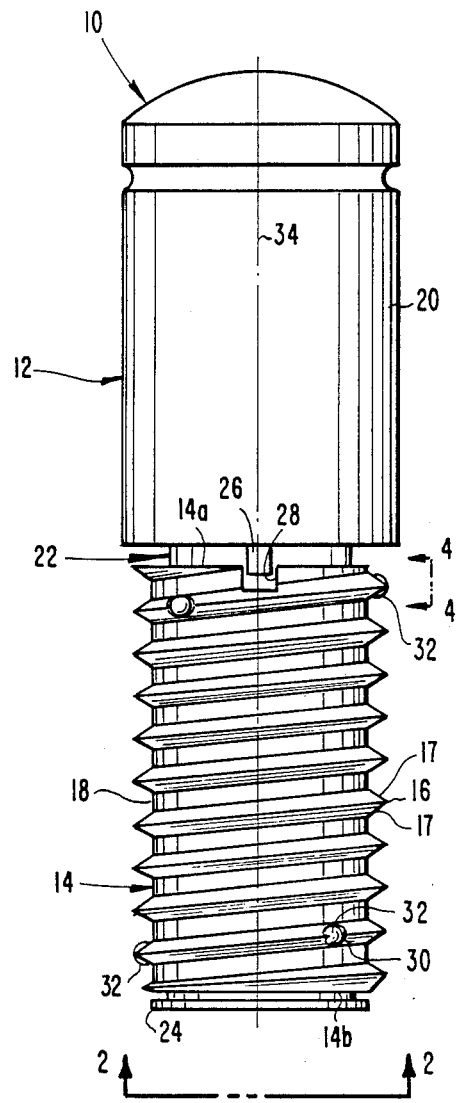
FIG. 1 is a side elevational view of the thread pitch cylinder gage of one embodiment of the present invention.

The thread pitch cylinder gage 10 of the first embodiment of the present invention comprises a gage post 12 and an externally threaded sleeve 14, as shown in FIG. 1. Sleeve 14 includes a continuous thread 16, the thread 16 having flank portions 17. The sleeve 14 is externally threaded for use with a workpiece having an internally threaded bore that is to be inspected. In this preferred embodiment, the thread 16 is of the same size or smaller than the maximum material condition (MMC) size of the internal threads of the workpiece. The root diameter 18 of the threaded sleeve is the same size or smaller than the MMC size of the minor diameter of the internal threads of the workpiece.

The gage post 12 includes a gage head 20, a bearing surface 22 and a retaining cap 24. The gage head 20 is precision machined so that its outer diameter equals, in the preferred embodiment, the maximum material condition size of the major diameter of the screw or bolt it represents. As will be described further herein, the gage head 20 is precision machined to provide a gauging surface to be used in conjunction with a functional gage, or to be used by other inspection techniques (such as CMM surface plate inspection) to determine the amount of positional tolerance used of the threaded bore of the workpiece.

The bearing surface 22 extends through the interior of the externally threaded sleeve 14. The retaining cap 24 is suitably affixed to the bearing surface 22 to trap the sleeve 14 between the gage head 20 and the retaining cap 24 of the gage post 12. In the preferred embodiment, the retaining cap 24 is a ring that is press-fit onto the bearing surface 22. The retaining cap 24 may also comprise a ring that is press-fit onto a reduced diameter portion of bearing surface 22. Alternatively, the retaining cap can be integral, or one-piece, with the gage post 12, with the sleeve 14 engaged between the cap 24 and the head 20 using a typical cold shrink-fit process. The outer diameter of the retaining cap may not exceed the MMC size of the minor diameter of the internal threads in the workpiece, otherwise the gage 10 cannot enter the workpiece bore. The bearing surface 22 has a maximum outer diameter equal to the least material condition (LMC) size of the pitch diameter minus 1.5× the best wire size (that is, the best wire size used in determining the pitch diameter of the workpiece threads in a standard gauging procedure). The bearing surface 22 includes a key 26 projecting axially from the gage head 20. The sleeve 14 includes a notch 28 complementary to key 26, so that when the sleeve 14 is installed on gage post 12, the key 26 will engage in the notch 28 to prevent rotation of sleeve 14 relative to bearing surface 22.

Figure 2:
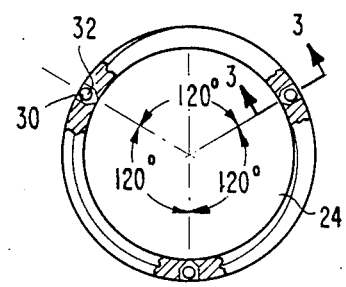
FIG. 2 is a partial cutaway end view of the thread pitch cylinder gage shown in FIG. 1.

Adjacent each end of the externally threaded sleeve 14 is a collection of retaining cavities 30, each formed by a bore through the externally threaded sleeve 14. A ball 32 is trapped within each of the retaining cavities 30. In the preferred embodiment, there are three retaining cavities 30 at each end of the sleeve 14, each of the cavities circumferentially spaced at 120 degree intervals around the sleeve, as illustrated in FIG. 2. Moreover, as shown in FIG. 1, the retaining cavities at end 14a are circumferentially offset from the retaining cavities at end 14b of the externally threaded sleeve 14, in order to establish a maximum distance between the retaining cavities at end 14a and the cavities at end 14b, as dictated by the length of the thread in the workpiece. In the illustrated embodiment, the offset between the cavities at ends 14a and 14b is coincidentally about 60 degrees; however, any other angular arrangement between the groups at ends 14a and 14b is acceptable, provided the balls in the two groups are situated as far apart as possible given the length of the gage. This arrangement of retaining cavities and balls between ends 14a and 14b ensures a true location for the axis 34 defined by the two collections of retaining cavities and balls, that corresponds to the pitch cylinder axis of the internally threaded bore of the workpiece.

Figure 4:
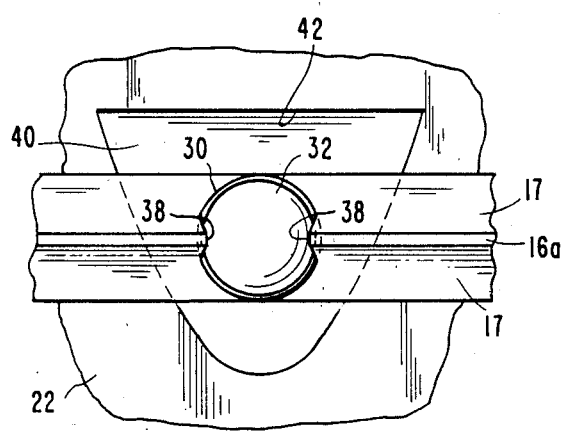
FIG. 4 is an enlarged view of the ball and retaining cavity in the thread pitch cylinder gage shown in FIG. 1, taken along line 4—4 and viewed in the direction of the arrows shown, with a portion of the sleeve cut away.

The details of the retaining cavity 30 and ball 32 configuration are described with reference to FIGS. 3 and 4. The retaining cavity 30 is cut through the thread 16 of the sleeve 14 and includes a chamfered portion 36 at the inner diameter of sleeve 14. The chamfer 36 reduces the size of retaining cavity 30 to restrain the ball 32 within the cavity 30, while allowing the ball to project beyond the inner diameter of sleeve 14 into the position 32', as shown in FIG. 3. The chamfer 36 is provided primarily as an assembly convenience to retain the balls as the gage post is inserted into the sleeve 14. The chamfer 36 may be eliminated to reduce the precision machining required, at the expense of a more cumbersome procedure to assemble the gage 10. The retaining cavity 30, and consequently the ball 32, are centered between the flanks 17 of the thread 16. The crown 16a of the thread 16 is crimped at location 38 on opposite sides of retaining cavity 30 that is cut through thread 16, as shown in FIG. 4. The crimped portions 38 retain the ball 32 within the cavity 30.

It is seen in FIG. 3 that when the ball 32 is positioned as shown, the outer surface of the ball extends beyond the flanks 17 of the thread 16. The ball portions 32a that extend beyond the flanks 17 tangentially engage the thread grooves of the internally threaded bore of the workpiece when the ball is positioned as shown in solid lines in FIG. 3. When the ball portions 32a are held in this tangential contact with the internal thread groove of the workpiece at the six locations along the externally threaded sleeve 14, the sleeve 14 is, effectively, locked into contact with the internally threaded bore of the workpiece. In the preferred embodiment, the diameter of the balls 32 is equal to the best wire size recommended in standard practice for the particualar thread pitch of the workpiece threads. Balls sized in this manner will contact the flanks of the thread grooves at the pitch diameter of the workpiece threaded bore to insure that the balls will properly lock in the bore and that the pitch cylinder axis will be properly defined.

In order to urge the ball 32 into contact with the internal threads of the workpiece, the bearing surface 22 of the gage post 12 is provided with a cam surface 40 that is indented from the bearing surface and sloped as shown in FIG. 3. The cam surface 40 slopes radially inwardly from the outer diameter of bearing surface 22 toward end surface 42. When the ball 32 is in the locked position, as shown in the solid lines of FIG. 3, the cam surface 40 is situated as shown so that the ball 32 has just begun to contact the incline of cam surface 40. When the ball is in the retracted position 32', as shown in the dashed lines of FIG. 3, the cam surface is in position 40' and the ball porjects radially inwardly from the inner diameter of sleeve 14. In the retracted position 32', the ball portions 32a' are within the flanks 17 of the thread 16 so that the ball portions 32a' do not contact the internal threads of the workpiece.

In the preferred embodiment, the cam surface 40 is formed by grinding the gage post 12 at an angle, which causes the cam surface to assume a parabolic shape as shown in FIG. 4. The steepness of the angle of the cam surface will determine how much axial motion of the gage post 12 is required to move the balls 32 between the retracted and locking positions. The amount of axial motion of the gage post is also determined by the actual pitch diameter of the workpiece threaded bore—that is, when the workpiece pitch diameter is at the small end of the tolerance band, the balls 32 are urged into contact with the workpiece threads while the balls are near the middle of the cam portions 40. When the workpiece pitch diameter is at the large end of the tolerance band, the balls must be moved further along the cam surface before the balls contact the workpiece threads, in some cases, until the balls are on the bearing surface beyond the junction between the cam surface and the bearing surface. This feature of the thread pitch cylinder gage 10 allows the gage to be used to establish a pitch cylinder axis, regardless of the feature size of the workpiece threads.

Figure 5:
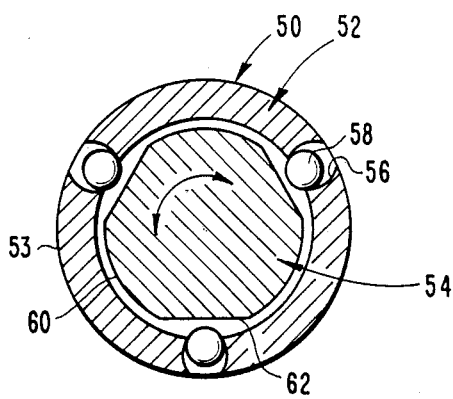
FIG. 5 is a cross sectional view of the thread pitch cylinder gage of a second embodiment of the present invention, the cross section being taken along a thread of the gage.

In a second embodiment of the present invention, a thread pitch cylinder gage 50 includes an externally threaded sleeve 52 with a plurality of retaining cavities 56 and balls 58, as shown in FIG. 5, similar to that employed in the sleeve 14 of the former embodiment. For simplicity, the cross-section in FIG. 5 is taken along the continuous thread 53 of sleeve 52. Gage post 54 replaces gage post 12 of the previous embodiment. Unlike the former embodiment, however, the gage post 54 does not include the key 26 and notch 28 arrangement, because gage post 54 is adapted to rotate within externally threaded sleeve 52. The gage post 54 of the second embodiment includes a flat section 62 radially adjacent each of the retaining cavities 56. Between each flat section 62 is a curved bearing surface 60 that has the same diameter as bearing surface 22 of the first embodiment. When each of the flat sections 62 are aligned with the retaining cavities 56 and balls 58, the balls are in the retracted position. However, when gage post 54 is rotated relative to sleeve 52, the flat sections 62 act as cam surfaces to gradually force the balls 58 outwardly until the balls contact the internal threads of the workpiece, in a similar fashion to that previously described with reference to the first embodiment. In the normal circumstance, the balls will lock between the flat sections and the internal threads. However, if the pitch diameter is sufficiently large, the gage psot 54 may be rotated further relative to the sleeve 52 so that the balls ride up the flat sections 62 onto the bearing surface 60.

In order to thread the sleeve 52 of this second embodiment into the workpiece internally threaded bore, a key and notch arrangement similar to that employed in the first embodiment can be provided. However, since the gage post 54 must be allowed to rotate within sleeve 52 in order to lock or retract the balls 58, some axial separation between the key and notch must be provided so that they can be completely disengaged to allow the required rotation.

In the second embodiment as illustrated, the gage post 54 has a constant cross-section along its length. Thus, the balls at either end of the sleeve 52 must be axially aligned so that the flat sections 62 will coincide with the circumferentially spaced balls at both ends. In order to accommodate the circumferential offset between the ball locations at one end of the sleeve 52 relative to the other end, as described in the discussion of the first embodiment, an additional set of flat surfaces would be required midway along the curved bearing surfaces 60.

Figure 6:
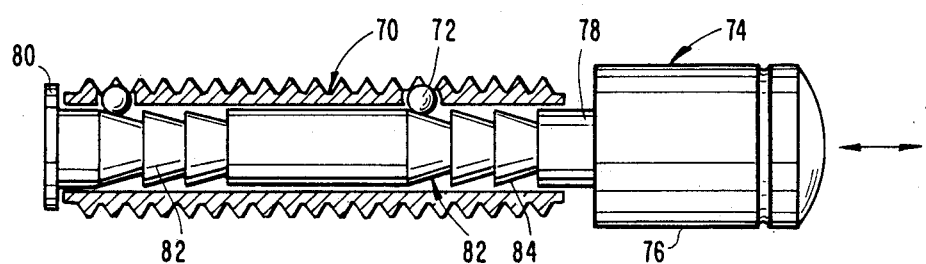
FIG. 6 is a side partial cross sectional view of the thread pitch cylinder gage of a third embodiment of the present invention.

In a third embodiment of the present invention, illustrated in FIG. 6, the externally threaded sleeve 70 and ball assembly 72 is identical to the externally threaded sleeve 14 and its ball assembly in the first embodiment. The gage post of the third embodiment including a gage head 76 similar to gage head 20, a bearing surface 78 and a cap 80 similar to retaining cap 24 of the first embodiment. The bearing surface 78, however, includes a pair of cam sections 82 located radially adjacent each of the ball assemblies 72 in the externally threaded sleeve 70. Each of the cam sections 82 includes a frusto-conical portion 84 beneath each ball in the ball assemblies 72. When the gage post 74 is translated axially relative to the sleeve 70, in the direction indicated by the heavy arrows in FIG. 6, the balls of the ball assemblies 72 are urged radially outwardly by the frusto-conical portions 84 in the same manner that cam surfaces 40 operate in the first embodiment.

Figure 7:
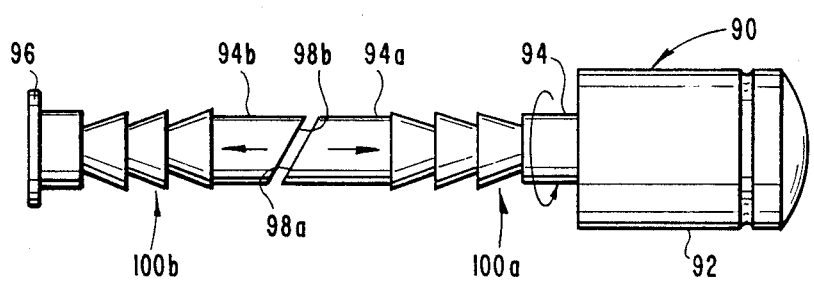
FIG. 7 is a side view of the gage post of the thread pitch cylinder gage of a fourth embodiment of the present invention.

In FIG. 7, the gage post assembly 90 of a fourth embodiment of the present invention is illustrated. The gage post assembly 90 is adapted to replace the gage post 74 of the immediately previous embodiment. The gage post assembly 90 includes a gage head 92, a bearing surface 94 and a cap 96. The bearing surface 94 is split into a first half 94a and a second half 94b. The split between the bearing surface halves 94a and 94b is at the inclined cam ends 98a and 98b, respectively. The first half 94a of the bearing surface includes a frusto-conical portions 100a, while the second half 94b includes a reverse frusto-conical portion 100b.

In this fourth embodiment, the gage post 90 is adapted to rotate relative to the externally threaded sleeve, as shown by the counterclockwise arrow in FIG. 7. As the gage post 90 is rotated in the direction of the arrow, the inclined cam ends 98a and 98b rotate against each other forcing the first and second halves 94a and 94b apart, as shown by the heavy arrows. As the first and second halves 94a and 94b are forced apart, the frusto-conical sections 100a and 100b, respectively, urge the balls outwardly into the locking position. One advantage of this fourth embodiment is that the gage post 90 will maintain a minimum of six points of contact with the thread flanks, even when the thread is tapered, that is when one end of the thread is larger than the other end. This particular embodiment, consequently, is also useful for gauging tapered pipe threads.

Figure 8:
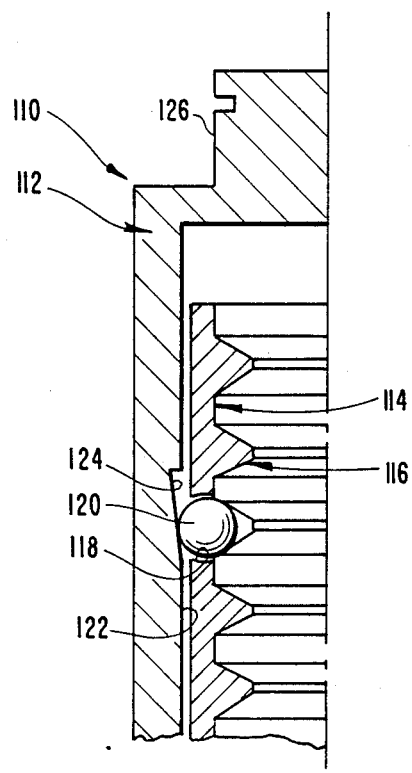
FIG. 8 is a side cross sectional view of the thread pitch cylinder gage of a fifth embodiment of the present invention adapted for use with a male threaded workpiece.

Turning now to FIG. 8, a longitudinal cross sectional view is shown of a thread pitch cylinder gage 110 adapted for use with a male threaded post on the workpiece. The gage 110 includes a hollow gage post 112 and an internally threaded sleeve 114. The sleeve 114 includes internal threads 116, recesses 118 and balls 120 trapped within the recesses 118. The gage post 112 includes an internal bearing surface 122 and an internal cam surface 124 similar to the bearing surface 22 and cam surface 40 described with reference to the first embodiment of the invention, except that the surface are on the inner diameter of the gage post 112 rather than on the outer diameter, and also includes a gage head 126. The thread pitch cylinder gage 110 for male threaded workpieces operates in the same manner as the thread pitch cylinder gage 10 for the female threaded workpiece. It is also apparent from the foregoing description that the gages described in the third, fourth and fifth embodiments can also be adapted for use with a male threaded workpiece.

Figure 9:
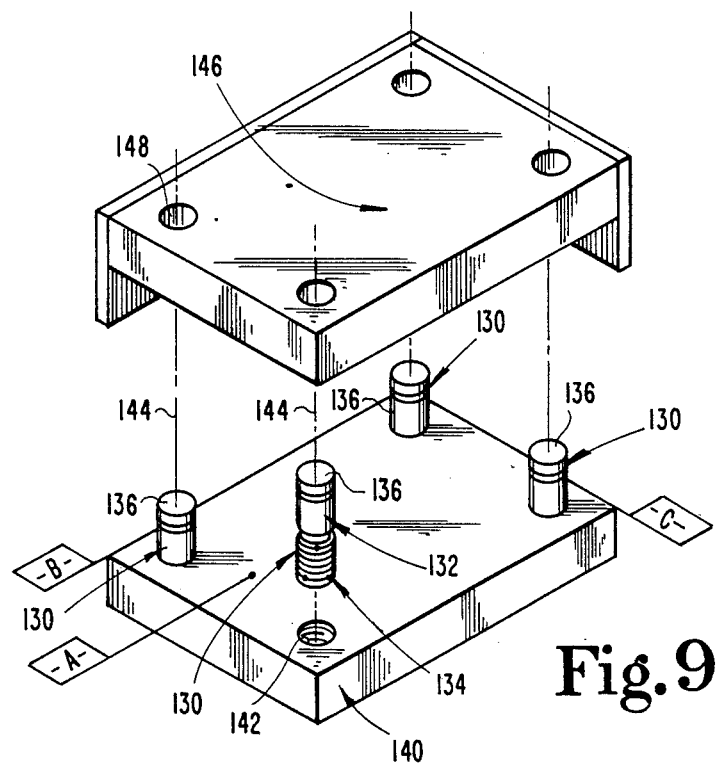
FIG. 9 is an illustration of the use of the thread pitch cylinder gage of the present invention in conjunction with a workpiece and a functional gage.

The use and operation of the thread pitch cylinder gage of the present invention is illustrated with reference to FIG. 9. For purposes of clarity, the pitch cylinder gage 130 illustrated in FIG. 9 is, in all respects, identical to the thread pitch cylinder gage 10 of the first preferred embodiment. In the illustration, a workpiece 140 includes four internally threaded bores 142. A pitch cylinder gage 130 is threaded into each of the bores 142 and locked within the bores by pulling upwardly on the gage post 132. As previously described, when the gage post 132 is translated axially relative to the externally threaded sleeve 134, the six balls trapped within the recesses in the sleeve 134 are urged outwardly by cam portions on the gage post 132 so that the balls tangentially engage the internal threads of the threaded bore 142. The pattern of balls in the externally threaded sleeve 134 spatially define a cylinder having an axis 144 that is coaxial with the pitch cylinder axis of the threaded feature, regardless of the feature size of the threaded bores 142.

With the thread pitch cylinder gages 130 locked in position within threaded bores 142 of the workpiece 140, a functional gage 146 having a number of gage holes 148 is placed over the gage heads 136 of the pitch cylinder gages exposed above the surface of the workpiece 140. As previously described, the gage head 136 of the thread pitch cylinder gage 130 has an outer diameter equal to the maximum material condition (MMC) size of the major diameter of the screw or bolt it represents. Thus, the thread pitch cylinder gages 130 in conjunction with the functional gage 146 identifies the presence of interference between outside diameters of screw, represented by the pitch cylinder gage, and the bores in the mating part, represented by the functional gage, when the mating part is engaged with the workpiece. When used in this manner, the thread pitch cylinder gage 130 complies with the measurement standards defined in the American National Standards Institute (ANSI) Standard Y14.5M-1982, paragraph 5.5.

It is apparent that the gage 130 can be used in conjunction with a coordinate measuring machine, rather than with a functional gage. Once the inspection operation is complete, the gage 130 can be unlocked from the threaded bore 142 by pushing the gage post 132 into the threaded sleeve 134 until the balls follow the cam surfaces on the gage post into the retracted position. The pitch cylinder gage 130 can then be unscrewed from the bore 142 in the normal fashion.

The thread pitch cylinder gage 130 can also be used as a go/no-go gage for the pitch cylinder diameter. The sleeve 134 is threaded to coordinate with the thread features specified for a particular threaded bore 142 of the workpiece. If, when the installed gage post 132 is pulled axially relative to the externally threaded sleeve 134, the balls in the sleeve 134 do not lock in the internally threaded bore 142, then it is known that the pitch cylinder diameter of the internally threaded bore 142 in the workpiece 140 exceeds the upper diameter limit for the class of thread specified. If the thread size is too large, the pitch cylinder gage will have some sideplay when the gage is fully situated within the threaded bore. Moreover, since the pitch cylinder diameter of the threads on the externally threaded sleeve 134 are machined to the lower size limit for the specified workpiece threads, the gage will not go into the bore 142 if the lower limit of the pitch cylinder diameter of the threaded bore 142 has not been met.

The thread pitch cylinder gage 130 can also be used to determine violations of the maximum material condition (MMC) of the thread form for the threaded bore 142. If the pitch cylinder gage will not completely enter the threaded bore 142, the MMC of the entire thread form has been violated, such as will typically result from the bore being tapped in a separate operation from the tap drilling step. Thus, the pitch dimeter gage can be used to determine if the internal threads of the bore 142 are outside a particular limit of concentricity with the minor diameter of the bore.

Finally, the thread pitch cylinder gage 130 can be used to assess the perpendicularity of the bore 142 with the surface of the workpiece 140. In this instance, the gage 130 gives a visual indication of the perpendicularity. If the degree of non-perpendicularity is too small to detect visually, inspection equipment can make the requisite measurements relative to the precision machined surface of the gage head 136.

The present invention encompasses replacing the ball in the thread pitch cylinder gage with an element sized to tangentially engage at least one point in the thread groove. Since the thread is generally tapped in a single operation, the form of the thread groove will be constant and determinable. Thus, a pitch cylinder gage in which the ball elements are replaced with radially extending pins that contact the thread root, for instance, will also define an axis coaxial with the pitch cylinder axis of the threaded feature. A gage using radial pins as described would be generally limited to use in determining the positional accuracy of a threaded feature only.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A pitch cylinder gage, comprising:
   at least four means for tangentially engaging the thread grooves of a threaded feature on a workpiece;
   means for retaining said tangentially engaging means, said retaining means including means for axially spacing a plurality of said tangentially engaging means and for circumferentially spacing a separate plurality of said tangentially engaging means; and rotatable means for moving said tangentially engaging means into engagement with the thread grooves, whereby a cylinder coaxial with the pitch cylinder of the threaded feature is spatially defined by said tangentially engaging means, said rotatable moving means including a cam element of circumferentially varying radius rotatably coupled to said retaining means, said rotatable cam element being adapted to contact said tangential engaging means and move them into engagement with the thread grooves when rotated relative to said retaining means.

2. The pitch cylinder gage of claim 1, wherein:

each of said at least four tangentially engaging means includes a ball having a diameter sufficiently small to engage within the thread grooves;

said means for retaining includes an elongated hollow housing with a bearing surface and at least four bores therethrough, each of said at least four bores being adapted to retain at least one of said balls therein; and said rotatable cam element is movable relative to said bearing surface and has at least four cam surfaces, each of said at least four cam surfaces being adapted to contact at least one of said balls and operable to move said one of said balls into engagement with the thread grooves when said cam element is rotated relative to said bearing surface.

3. A pitch cylinder gage comprising:

a cylindrical housing having a threaded outer surface adapted to engage the threads of a threaded bore on a workpiece, said housing defining axially separated sets of cavities extending radially through said threaded outer surface;

an elongated post concentric with and rotatable within said housing, said post having a circumferentially varying radius defining a rotatably actuated cam; and a flank contact element positioned within each of said cavities, said flank contact elements each being radially extendable into contact with a thread flank of the bore in response to rotation of said cam with respect to said housing.

4. A pitch cylinder gage useful for inspecting thread position, orientation and size of a threaded feature on a workpiece, comprising:

a cylindrical housing having a threaded surface adapted to engage the threads of the threaded feature;

an elongated gage element concentric with said housing and rotatable relative to said housing; and locking means for locking said pitch cylinder gage against movement relative to the workpiece, including at least two thread engaging means, axially disposed on said housing relative to each other, for engaging flanks of the threads of the threaded feature, each of said thread engaging means having a number of locking elements adapted to be received between adjacent threads of the threaded feature when in a locking position; and means for retaining each of said locking elements in said housing between the flanks of a housing thread on said threaded surface, wherein each of said locking elements is radially slidable within said retaining means to and from said locking position;

said locking means further including a rotatably actuated cam element having higher and lower portions on said gage element arranged so that like portions of said cam element can be simultaneously radially aligned with said locking elements, wherein said cam element is rotatably movable to and from a position in which said higher cam portions urge said locking elements radially into said locking position in response to said gage element being moved relative to said housing; and wherein when said gage element is in a first position relative to said housing said lower cam portions are in radial alignment with said locking elements, and when said gage element is rotated relative to said housing to a second position said higher cam portions contact said locking elements to urge said locking elements into said locking position.

5. The pitch cylinder gage according to claim 4, wherein:

each of said several locking elements comprises a ball said retaining means for each of said at least two thread engaging means includes several bores through said housing thread, corresponding to said several balls, having a diameter sized to receive one of said balls therein, and further having a reduced diameter opening at least at a crown of said housing thread.

6. The pitch cylinder gage according to claim 5, wherein said reduced diameter opening at said crown of said housing thread includes a number of crimped portions on said crown.

7. The pitch cylinder gage according to claim 4, wherein:

one of said at least two thread engaging means is located adjacent one end of said housing and includes three of said locking elements circumferentially spaced on said housing thread at 120° intervals; and another of said at least two thread engaging means is located adjacent the other end of said housing and includes three of said locking elements circumferentially spaced on said housing thread at 120° intervals and circumferentially disposed relative to the three locking elements at said one end of said housing so that the locking elements of said another of said at least two thread engaging means are as distal as possible from the locking elements of said one of said at least two thread engaging means.

8. A pitch cylinder gage useful for inspecting thread position, orientation and size of a threaded feature on a workpiece, comprising:

a cylindrical housing have a threaded outer surface adapted to engage the threads of the threaded feature and including an inner bearing surface;

an elongated gage element concentric with said housing and movable relative to the workpiece, said elongated gage element including a post extending through said housing and rotatable against said inner bearing surface relative to said housing; and locking means for locking said pitch cylinder gage against movement relative to the workpiece, including at least two thread engaging means, axially disposed on said housing relative to each other, for engaging flanks of the threads of the threaded feature, each of said thread engaging means having
- a number of locking elements adapted to be received between adjacent threads of the threaded feature when in a locking position; and
- means for retaining each of said locking elements in said housing between the flanks of a housing thread on said threaded surface, wherein each of said locking elements is radially slidable within said retaining means to and from said locking position;

said locking means further including a plurality of cam surfaces on said gage element arranged so that each of said cam surfaces can be simultaneously radially aligned with at least one of said locking elements, wherein said plurality of cam surface are movable to and from a position in whcih said cam surfaces urge said locking elements radially into said locking position in response to said post being moved relative to said housing;

said locking means further including a plurality of longitudinally extending flat surfaces on said post and each of said plurality of cam surfaces includes a longitudinally extending arcuate surface interposed between two of said flat surfaces on said post, wherein when said post is in a first position relative to said housing one each of said plurality of flat surfaces is in radial alignment with at least one of said several locking elements, and when said post is rotated relative to said housing to a second position each of said arcuate surfaces contacts at least one of said several locking elements to urge said locking elements into said locking position.

9. The pitch cylinder gage according to claim 8, further comprising:
- a gage head integral with one end of said post, said gage head having an outer diameter larger than the diameter of said inner bearing surface of said cylindrical housing; and
- a retaining cap affixed at the other end of said post having an outer diameter larger than the diameter of said inner bearing surface, wherein said gage head and said retaining cap axially contain said housing on said post.

10. The pitch cylinder gage according to claim 9, wherein said gage head has an outer diameter equal to the maximum material condition size of the major diameter of the threads of an equivalent screw that fits into the threaded bore.

11. A pitch cylinder gage useful for inspecting a threaded feature on a workpiece having a continuous thread groove and a pitch diameter, comprising:
- first means for spatially defining a first diameter corresponding to the pitch diameter of the threaded feature;
- second means, axially disposed on the threaded feature relative to said first means, for spatially defining a second diameter corresponding to the pitch diameter of the threaded feature, whereby said first diameter and said second diameter spatially define a cylinder having a first axis coaxial with the pitch cylinder axis of the threaded feature;
- a gage element having an axis coaxial with said first axis; and
- a hollow threaded retainer adapted to engage the threads of the threaded feature;
- wherein each of said first and second means includes means for tangentially engaging the thread groove of the threads of the threaded feature, each of said tangentially engaging means including several balls, each of said balls having a diameter sufficiently small to engage within the thread grooves;
- wherein each fo said first and second means further includes several bores extending through said retainer, each of said several bores being adapted to retain at least one of said several balls therein;

said pitch cylinder gage further comprising:
- rotatable moving means for moving each of said tangentially engaging means into engagement with said thread groove, said rotatable moving means including a cam element rotatable relative to said retainer and having a plurality of cam surfaces, each of said plurality of cam surfaces being adapted to contact at least one of said balls and operable to move said one of said balls into engagement with the thread groove when said cam element is rotated relative to said retainer.

12. A pitch cylinder gage, comprising:
- a cylindrical housing having a threaded outer surface adapted to engage the threads of a threaded bore on a workpiece, said housing defining axially separated sets of cavities extending radially through said threaded outer surface;
- a rotary camshaft mounted within said housing, said camshaft having a rotary cam portion radially adjacent each set of said cavities; and
- a flank contact element positioned within each of said cavities, said flank contact elements each being radially extendable into contact wiht a thread flank of the bore in response to rotation of said rotary camshaft with respect to said housing.

13. The pitch cylinder gage of claim 12 wherein said rotary camshaft includes a cam surface of continuously varying radius radially adjacent each of said cavities in at least one angular position of said rotary camshaft.

14. The pitch cylinder gage of claim 13 wherein each said cam surface includes a flat section, said rotary camshaft further including a curved section of uniform radius between adjacent flat sections.

15. The pitch cylinder gage of claim 14 wherein said flat sections and curved sections extend longitudinally along said rotary camshaft.

* * * * *